United States Patent
Zohar et al.

(10) Patent No.: US 9,400,844 B2
(45) Date of Patent: Jul. 26, 2016

(54) SYSTEM FOR FINDING WEBSITE INVITATION CUEING KEYWORDS AND FOR ATTRIBUTE-BASED GENERATION OF INVITATION-CUEING INSTRUCTIONS

(75) Inventors: Tzach Zohar, Tel-Aviv (IL); Amir Bar, Rehovot (IL); Nir Cohen, Rishon Lezion (IL)

(73) Assignee: KENSHOO LTD., Tel Aviv (IL)

( * ) Notice: Subject to any disclaimer, the term of this patent is extended or adjusted under 35 U.S.C. 154(b) by 282 days.

(21) Appl. No.: 12/954,436

(22) Filed: Nov. 24, 2010

(65) Prior Publication Data

US 2011/0099186 A1 Apr. 28, 2011

Related U.S. Application Data

(63) Continuation of application No. PCT/IL2008/000709, filed on May 26, 2008.

(51) Int. Cl.
*G06F 17/30* (2006.01)

(52) U.S. Cl.
CPC ............................ *G06F 17/30864* (2013.01)

(58) Field of Classification Search
CPC combination set(s) only.
See application file for complete search history.

(56) References Cited

U.S. PATENT DOCUMENTS

| | | | |
|---|---|---|---|
| 2003/0088554 A1* | 5/2003 | Ryan | G06F 17/3061 |
| 2005/0267973 A1* | 12/2005 | Carlson | G06Q 30/06 709/228 |
| 2006/0041548 A1* | 2/2006 | Parsons | G06Q 30/02 |
| 2006/0253586 A1 | 11/2006 | Woods | |
| 2008/0104031 A1 | 5/2008 | Grasso | |
| 2008/0294624 A1* | 11/2008 | Kanigsberg | G06F 17/30867 |
| 2009/0248484 A1* | 10/2009 | Surendran | G06Q 30/0201 705/7.29 |
| 2010/0299319 A1* | 11/2010 | Parson | G06Q 10/00 707/713 |

FOREIGN PATENT DOCUMENTS

| | | |
|---|---|---|
| AU | 2006233245 A1 | 5/2008 |
| AU | 2006233245 B2 | 5/2008 |
| AU | 2010101252 A4 | 12/2010 |
| AU | 2010241403 A1 | 12/2010 |

OTHER PUBLICATIONS

International Preliminary Report on Patentability for corresponding international application PCT/IL2008/00709 issued Nov. 30, 2010 and International Search Report mailed Jan. 7, 2009.

* cited by examiner

*Primary Examiner* — Shyue Jiunn Hwa
(74) *Attorney, Agent, or Firm* — Lewis Roca Rothgerber Christie LLP

(57) ABSTRACT

A system for identifying keywords which may include a non-acquiescence information collector operative to collect information indicating, for each individual website from among a multiplicity of websites, at least one keyword which brought at least one user into contact with said individual website but did not result in a defined criterion for acquiescence of a user to at least one suggestion presented by said website; and a negative keyword definer operative to define at least one specific keyword which brought at least one user into contact with a specific website but did not result in a transaction between said user and said website, as a negative keyword for said specific website. Positive keyword extraction based on aggregation of visitor acquiescence information may be provided. Paradigm structuring may include template generation of invitations and/or attribute based generation of invitation cueing sets.

2 Claims, 19 Drawing Sheets

| Field | Value | Description |
|---|---|---|
| Id | Integer | An identifying field for the page |
| URL | Text | The text of the keyword or the URL of the page |
| Language | A language code | |
| Source | Integer | The identification of the source which directly brought to this page |
| ICS Id | | The id of the Invitation Cueing Set (I.C.S) for which this page is assigned |

FIG. 7A

| Field | Value | Description |
|---|---|---|
| Id | Integer | An identifying field for the keyword |
| Text | Text | The text of the keyword |
| Language | A language code | |
| Page Id | Integer | The page id (in the Pages Table) of the page this keyword is related to |
| Source | Integer | The identification of the source which directly brought to this keyword |
| ICS Id | | The id of the Invitation Cueing Set (I.C.S) for which this page is assigned |

FIG. 7B

| Field | Value | Description |
|---|---|---|
| Page Id | Integer | An identifying field for the page which holds this attribute |
| Name | Text | The attributes' name |
| Value | | The attributes' value |
| Type | Integer, String, Float etc. | An indication as to how to parse the value field |

FIG. 7C

| Field | Value | Description |
| --- | --- | --- |
| Id | Integer | An identifying field |
| Type | 'Keyword', 'Page' or 'Feed' | The type of the source |
| Content | Text | |
| Item Id | Integer | The id of the item in the relevant table (by type) |

FIG. 7D

| Field | Value | Description |
| --- | --- | --- |
| Id | Integer | An identifying field |
| Content | | This can span several fields and contains some format of the invitation information which the user can see |
| Redirection | Land URL | The target site of the invitation |
| ICS Id | | The id of the Invitation Cueing Set (I.C.S) for which this invitation is assigned |

FIG. 7E

| Field | Value | Description |
| --- | --- | --- |
| Id | Integer | An identifying field |
| Name | Text | An identifying string which enables a user to recognize the Invitation Cueing Set |
| GeoTarget | String | The geographical criterion for which this Invitation Cueing Set (I.C.S) is related |

FIG. 7F

| Field | Value | Description |
|---|---|---|
| Id | Integer | Identifier for the entry |
| Date | Date | The date-time of the request |
| Cookie | Text | A user identifying string |
| Referrer | Text | The URL of the referring site to this request |
| Keyword Id | Integer | The keyword id in the *Keywords Table* which is related to the invitation from which the user got to the website. This is usually stored in the redirection within the invitation as a parameter. |
| Action | Text | A string representing the type of action this request stands for. Can be a click, purchase, registration etc. |

FIG. 7G

| Field | Value | Description |
|---|---|---|
| Id | Integer | An identifying field for the negative keyword |
| Text | Text | The text of the negative keyword |
| Language | A language code | |
| Source | Integer | The identification of the source which directly brought to this negative keyword |
| ICS Id | | The id of the Invitation Cueing Set (I.C.S) for which this page is assigned |

FIG. 7H

```
<PAGE url="kenshoo.com/index.asp">Home, Sit Back</PAGE>
<PAGE url=" kenshoo.com/kenshoo_search.asp"> KENSHOO
SEARCH™, Kenshoo Search</PAGE>
<PAGE url=" http://kenshoo.com/services.asp ">Services, Services
</PAGE>
```

FIG. 8

| | | | | | |
|---|---|---|---|---|---|
| | Keyword | Language | Land URL | | Source | Type |
| ■ | John Smith | En edit | voteintheunitedstates.com\JohnSmith.html | edit | Feed.xml (feed) | Positive |
| ☐ | Vote John Smith | En edit | voteintheunitedstates.com\SaraJohnson.html | edit | Feed.xml (feed) | Positive |
| ☐ | Voter John Smith | Fr edit | | edit | Vote John Smith | Positive |
| ■ | Stop John Smith | En edit | | edit | John Smith | Negative |

Select All  Unselect All

[Reject]   [Save To Paradigm . >>]

| Id | Type | Content | Item Id |
|---|---|---|---|
| 1 | FEED | MySite.xml | Null |

FIG. 11A

| Id | Type | Content | Item Id |
|---|---|---|---|
| 1 | FEED | MySite.xml | Null |

FIG. 11B

| Id | Type | Content | Item Id |
|---|---|---|---|
| 1 | FEED | MySite.xml | Null |
| 2 | KEYWORD | Vote John Smith | 1 |

FIG. 11C

| Id | Type | Content | Item Id |
|---|---|---|---|
| 1 | FEED | MySite.xml | Null |
| 2 | KEYWORD | Vote John Smith | 1 |
| 3 | KEYWORD | Democrat candidate | 2 |
| 4 | KEYWORD | Vote Sara Johnson | 3 |
| 5 | KEYWORD | Republican candidate | 4 |

FIG. 11D

| Id | Type | Content | Item Id |
|---|---|---|---|
| 2 | KEYWORD | Vote John Smith | 1 |

FIG. 11E

| Id | Type | Content | Item Id |
|---|---|---|---|
| 2 | KEYWORD | Vote John Smith | 1 |
| 6 | KEYWORD | Voting John | 12 |

FIG. 11F

| Id | URL | Language | Source | ICS Id |
|---|---|---|---|---|
| 1 | voteintheunitedstates.com\JohnSmith.html | En | 1 | |

FIG. 12A

| Id | URL | Language | Source | ICS Id |
|---|---|---|---|---|
| 1 | voteintheunitedstates.com\JohnSmith.html | En | 1 | |
| 2 | voteintheunitedstates.com\SaraJohnson.html | En | 1 | |

FIG. 12B

| Id | Content | Language | Page Id | Source | ICS Id |
|---|---|---|---|---|---|
| 1 | Vote John Smith | En | 1 | 1 | |
| 2 | Democrat candidate | En | 1 | 1 | |

FIG. 13A

| Id | Content | Language | Page Id | Source | ICS Id |
|---|---|---|---|---|---|
| 1 | Vote John Smith | En | 1 | 1 | |
| 2 | Democrat candidate | En | 1 | 1 | |
| 3 | Sara Johnson | En | 1 | 1 | |
| 4 | Republican candidate | En | 1 | 1 | |

FIG. 13B

| Id | Content | Language | Page Id | Source | ICS Id |
|---|---|---|---|---|---|
| 1 | Vote John Smith | En | 1 | 1 | |
| 2 | Democrat candidate | En | 1 | 1 | |
| 3 | Vote Sara Johnson | En | 2 | 1 | |
| 4 | Republican candidate | En | 2 | 1 | |
| 5 | Governor Smith | En | | 2 | |
| 6 | voting Smith | En | | 2 | |

FIG. 13C

| Id | Content | Language | Page Id | Source | ICS Id |
|---|---|---|---|---|---|
| 1 | Vote John Smith | En | 1 | 1 | |
| 2 | Democrat candidate | En | 1 | 1 | |
| 3 | Vote Sara Johnson | En | 2 | 1 | |
| 4 | Republican candidate | En | 2 | 1 | |
| 5 | Governor Smith | En | | 2 | |
| 6 | voting John Smith | En | | 2 | |
| 7 | Voter John Smith | Fr | | 2 | |

FIG. 13D

| Id | Content | Language | Page Id | Source | ICS Id |
|---|---|---|---|---|---|
| 1 | Vote John Smith | En | 1 | 1 | |
| 2 | Democrat candidate | En | 1 | 1 | |
| 3 | Vote Sara Johnson | En | 2 | 1 | |
| 4 | Republican candidate | En | 2 | 1 | |
| 5 | Governor Smith | En | | 2 | |
| 6 | voting John Smith | En | | 2 | |
| 7 | Voter John Smith | Fr | | 2 | |
| 8 | Candidat de Democrat | Fr | | 3 | |
| 9 | Johnson Security LTD. | En | | 4 | |
| 10 | Voter Sara Johnson | Fr | | 4 | |
| 11 | Candidat Républicain | Fr | | 5 | |

FIG. 13E

| Id | Content | Language | Page Id | Source | ICS Id |
|---|---|---|---|---|---|
| 1 | Vote John Smith | En | 1 | 1 | 1 |
| 2 | Democrat candidate | En | 1 | 1 | |
| 3 | Vote Sara Johnson | En | 2 | 1 | |
| 4 | Republican candidate | En | 2 | 1 | |
| 5 | Governor Smith | En | | 2 | |
| 6 | voting John Smith | En | | 2 | |
| 7 | Voter John Smith | Fr | | 2 | |
| 8 | Candidat de Democrat | Fr | | 3 | |
| 9 | Johnson Security LTD. | En | | 4 | |
| 10 | Voter Sara Johnson | Fr | | 4 | |
| 11 | Candidat Républicain | Fr | | 5 | |

FIG. 13F

| Id | Content | Language | Page Id | Source | ICS Id |
|---|---|---|---|---|---|
| 1 | Vote John Smith | En | 1 | 1 | 1 |
| 2 | Democrat candidate | En | 1 | 1 | 1 |
| 3 | Vote Sara Johnson | En | 2 | 1 | 2 |
| 4 | Republican candidate | En | 2 | 1 | 2 |
| 5 | Governor Smith | En | | 2 | 1 |
| 6 | voting John Smith | En | | 2 | 1 |
| 7 | Voter John Smith | Fr | | 2 | 1 |
| 8 | Candidat de Democrat | Fr | | 3 | 1 |
| 9 | Johnson Security LTD. | En | | 4 | 2 |
| 10 | Voter Sara Johnson | Fr | | 4 | 2 |
| 11 | Candidat Républicain | Fr | | 5 | 2 |

FIG. 13G

| Id | Content | Language | Page Id | Source | ICS Id |
|---|---|---|---|---|---|
| 12 | Voting John | En | | 1 | |

FIG. 13H

| Id | Content | Language | Page Id | Source | ICS Id |
|---|---|---|---|---|---|
| 12 | Voting John | En | | 2 | |
| 13 | Voting John John | En | | 6 | |
| 14 | Voter pour John | Fr | | 6 | |

FIG. 13I

| Id | Content | Language | Page Id | Source | ICS Id |
|---|---|---|---|---|---|
| 12 | Voting John | En | | 2 | 1 |
| 13 | Voting John John | En | | 6 | 1 |
| 14 | Voter pour John | Fr | | 6 | 1 |

FIG. 13J

| Page | Name | Value | Type |
|---|---|---|---|
| 1 | LandUrl | voteintheunitedstates.com\JohnSmith.html | String |
| 1 | Age | 45 | String |
| 1 | Name | John Smith | String |
| 1 | Gender | Male | Float |
| 1 | Party | Democrat | Float |

FIG. 14A

| Page | Name | Value | Type |
|---|---|---|---|
| 1 | LandUrl | voteintheunitedstates.com\JohnSmith.html | String |
| 1 | Age | 45 | String |
| 1 | Name | John Smith | String |
| 1 | Gender | Male | Float |
| 1 | Party | Democrat | Float |
| 2 | LandUrl | voteintheunitedstates.com\SaraJohnson.html | String |
| 2 | Age | 43 | String |
| 2 | Name | Sara Johnson | String |
| 2 | Gender | Female | Float |
| 2 | Party | Republican | Float |

FIG. 14B

| Id | Name | Target |
|---|---|---|
| 1 | John Smith | |

FIG. 15A

| Id | Name | Target |
|---|---|---|
| 1 | John Smith | |
| 2 | Sara Johnson | |

FIG. 15B

| Id | Data* | Redirection | ICS Id |
|---|---|---|---|
| 1 | Header: Vote For John Smith<br>Line 1: Participate in the US Elections!<br>Line 2: Vote for the democrat candidate!<br>Display URL: Voteintheunitedstates.com | voteintheunitedstates.com\JohnSmith.html | 1 |

FIG. 16A

| Id | Data | Redirection | ICS Id |
|---|---|---|---|
| 1 | Header: Vote For John Smith<br>Line 1: Participate in the US Elections!<br>Line 2: Vote for the democrat candidate!<br>Display URL: Voteintheunitedstates.com | voteintheunitedstates.com\JohnSmith.html | 1 |
| 2 | Header: Vote For Sara Johnson<br>Line 1: Participate in the US Elections!<br>Line 2: Vote for the republican candidate!<br>Display URL: Voteintheunitedstates.com | voteintheunitedstates.com\SaraJohnson.html | 2 |

FIG. 16B

| Id | Date | Cookie | | Keyword Id | Action |
|---|---|---|---|---|---|
| 1 | 2/5/2008 | 8FGJ | fakese.com/?q=Voting+John | 1 | Click |
| 2 | 2/5/2008 | 8FGJ | voteintheunitedstates.com\JohnSmith.html | 1 | Register |
| 3 | 3/5/2008 | J77Y | fakese.com/?q= Stop+Vote+John+Smith | 1 | Click |
| 4 | 4/5/2008 | J77Y | fakese.com/?q= Stop+Vote+John+Smith | 1 | Click |
| 5 | 5/5/2008 | KRT7 | fakese.com/?q=Stop+Vote+John+Smith | 1 | Click |
| 6 | 6/5/2008 | 9IKL | fakese.com/?q=Republican+Party | 5 | Click |
| 7 | 7/5/2008 | 9IKL | voteintheunitedstates.com\SaraJohnson.html | 5 | Vote |

FIG. 17

| Id | Content | Language | Page Id | Source | ICS Id |
|---|---|---|---|---|---|
| 1 | Stop | En | | 2 | |

FIG. 18A

| Id | Content | Language | Page Id | Source | ICS Id |
|---|---|---|---|---|---|
| 1 | Stop | En | | 2 | 1 |

FIG. 18B

SYSTEM FOR FINDING WEBSITE INVITATION CUEING KEYWORDS AND FOR ATTRIBUTE-BASED GENERATION OF INVITATION-CUEING INSTRUCTIONS

REFERENCE TO CO-PENDING APPLICATIONS

The present application is a continuation of International Patent Application No. PCT/IL2008/000709 filed on May 26, 2008, published Dec. 3, 2009 as Publication No. WO/2009/144698, the disclosure of which is incorporated herein by reference in its entirety.

Reference is made to co-pending U.S. patent application Ser. No. 12/031,352, entitled "Computer implemented system and method for enhancing keyword expansion" and filed 14 Feb. 2008, issued Jul. 5, 2011 as U.S. Pat. No. 7,974,989, claiming priority from U.S. Ser. No. 60/902,055 filed 20 Feb. 2007.

FIELD OF THE INVENTION

The present invention relates generally to websites and more particularly to systems displaying, to users of an information network, invitations to visit certain websites.

BACKGROUND OF THE INVENTION

Google Adwords enables website owners to advertise their websites on Google for a fee payable each time an Internet user clicks the advertisement. The website owner selects one or more keywords, which are words or phrases related to his/her website. When Internet users search on the Google search engine using one of the selected keywords, the website owner's advertisement may be displayed next to the search results. Google's Keyword Tool prompts website owners to enter words or phrases descriptive of their website, or to input the website's URL, and generates suggested keywords as a function of this input.

The disclosures of any publications and patent documents mentioned in the specification, and of any publications and patent documents cited therein directly or indirectly, are hereby incorporated by reference.

SUMMARY OF THE INVENTION

Certain embodiments of the present invention seek to provide a system for finding website invitation cueing keywords, based on user acquiescence information.

Certain embodiments of the present invention seek to provide a system for template generation of invitations to websites.

Certain embodiments of the present invention seek to provide a system for attribute-based generation of invitation-cueing sets.

There is thus provided, in accordance with at least one embodiment of the present invention, a system for identifying negative keywords, the system comprising a non-acquiescence information collector operative to collect information indicating, for each individual website from among a multiplicity of websites, at least one keyword which brought at least one user into contact with the individual website but did not result in a defined criterion for acquiescence of a user to at least one suggestion presented by the website; and a negative keyword definer operative to define at least one specific keyword which brought at least one user into contact with a specific website but did not result in a transaction between the user and the website, as a negative keyword for the specific website.

Also provided, in accordance with another embodiment of the present invention, is a method for identifying negative keywords, the method comprising collecting information indicating, for each individual website from among a multiplicity of websites, at least one keyword which brought at least one user into contact with the individual website but did not result in a defined criterion for acquiescence of a user to at least one suggestion presented by the website; and defining at least one specific keyword which brought at least one user into contact with a specific website but did not result in a transaction between the user and the website, as a negative keyword for the specific website.

Also provided, in accordance with another embodiment of the present invention, is a method for template generation of an invitation, the method comprising receiving digital input and deriving a set of keywords therefrom, defining a set of attributes for each keyword in the set by assigning an attribute value to each attribute in the set of attributes, for each keyword in the set of keywords, providing at least one invitation format including an arrangement of at least some of the attributes in the set of attributes; and generating at least one invitation having the format including, for at least one keyword in the set of keywords, arranging the keyword's attribute values in accordance with the arrangement.

Further provided, in accordance with another embodiment of the present invention, is a method for generating invitation cueing sets from a digital representation of a website comprising receiving digital input and deriving a set of keywords therefrom, defining a set of attributes for each keyword in the set by assigning an attribute value to each attribute in the set of attributes, for each keyword in the set of keywords, providing an invitation cueing keyword set generating criterion defined over the sets of attributes, and generating sets of invitation cueing keywords, each set comprising a subset of the set of keywords, using the criterion.

Also provided, in accordance with another embodiment of the present invention, is a method for improving utilization, by an individual website, of a system displaying invitations inviting users to visit websites, the invitations being displayed responsive to keywords associated with users, the method comprising extracting, from a website log recording interactions by a population of users with the individual website, at least one character string characterizing a user's session with the individual website, an associated invitation issued to the user responsive to an association of the user to the character string detected by the system; an associated ID of the user and an associated indication of interactions between the user and the website, defining at least one character string eligibility condition over the interactions associated with an individual character string, indicating that an individual character string is eligible to be defined as a keyword, checking character strings extracted from the website log to identify character strings conforming with at least one the eligibility condition, and designating to an invitation displaying system at least an individual one of the conforming character strings as a keyword responsive to which the invitation associated, in the website log, with which the individual conforming character string is to be issued.

Additionally provided, in accordance with another embodiment of the present invention, is an invitation display auxiliary apparatus for improving utilization, by an individual website, of a system displaying invitations inviting users to visit websites, the invitations being displayed responsive to keywords associated with users, the apparatus comprising a log-based user session definer operative to extract, from a website log recording interactions by a population of users with the individual website, at least one character string characterizing a user's session with the individual website, an associated invitation issued to the user responsive to an association of the user to the character string detected by the system; an associated ID of the user and an associated indication of interactions between the user and the website, a character string eligibility condition generator operative to define at least one character string eligibility condition over the interactions associated with an individual character string, indicating that an individual character string is eligible to be defined as a keyword, a string finder operative to check character strings extracted from the website log to identify character strings conforming with at least one eligibility condition, and an invitation display system interface operative to designate to an invitation displaying system at least an individual one of the conforming character strings as a keyword responsive to which the invitation associated, in the website log, with which the individual conforming character string is to be issued.

Additionally provided, in accordance with another embodiment of the present invention, is a system for generating invitation cueing sets from a digital representation of a website comprising apparatus for receiving digital input and deriving a set of keywords therefrom, a keyword attribute characterizer defining a set of attributes for each keyword in the set by assigning an attribute value to each attribute in the set of attributes, for each keyword in the set of keywords, an invitation cueing keyword set generator operative to generate sets of invitation cueing keywords, each set comprising a subset of the set of keywords, using an invitation cueing keyword set generating criterion defined over the sets of attributes.

Further provided, in accordance with another embodiment of the present invention, is an invitation template generation system comprising a keyword set generator operative to receive digital input and derive a set of keywords therefrom, a keyword characterizer operative to define a set of attributes for each keyword in the set by assigning an attribute value to each attribute in the set of attributes, for each keyword in the set of keywords, an invitation format generator providing at least one invitation format including an arrangement of at least some of the attributes in the set of attributes; and an invitation assembler operative to generate at least one invitation having the format including, for at least one keyword in the set of keywords, assembling the keyword's attribute values in accordance with the arrangement.

Further provided, in accordance with another embodiment of the present invention, is a method for improving utilization, by an individual website, of a system displaying invitations inviting users to visit websites, the invitations being displayed responsive to keywords associated with users, the method comprising extracting, from a website log recording interactions by a population of users with the individual website, at least one character string characterizing a user's session with the individual website, an associated invitation issued to the user responsive to an association of the user to the character string detected by the system; an associated ID of the user and an associated indication of any interactions between the user and the website, defining at least one character string eligibility condition on the interactions associated with an individual character string, indicating that an individual character string is eligible to be defined as a negative keyword, checking character strings extracted from the website log to identify character strings conforming with at least one the eligibility condition, and designating to an invitation displaying system at least an individual one of the conforming character strings as a negative keyword responsive to which the invitation associated, in the website log, with the individual conforming character string is not to be issued.

Also provided, in accordance with another embodiment of the present invention, is an invitation display auxiliary apparatus for improving utilization, by an individual website, of a system displaying invitations inviting users to visit websites, the invitations being displayed responsive to keywords associated with users, the apparatus comprising a log-based user session definer operative to extract, from a website log recording interactions by a population of users with the individual website, at least one character string characterizing a user's session with the individual website, an associated invitation issued to the user responsive to an association of the user to the character string detected by the system; an associated ID of the user and an associated indication of interactions between the user and the website, a character string eligibility condition generator operative to define at least one character string eligibility condition over the interactions associated with an individual character string, indicating that an individual character string is eligible to be defined as a keyword, a string finder operative to check character strings extracted from the website log to identify character strings conforming with at least one the eligibility condition; and an invitation display system interface operative to designate to an invitation displaying system at least an individual one of the conforming character strings as a negative keyword responsive to which the invitation associated, in the website log, with the individual conforming character string is not to be issued.

Certain embodiments of the present invention are useful in applications in which it is desired to find search terms which have yielded clicks but no conversions, define them as negative keywords and put them in a relevant invitation cueing set, e.g. adgroup, e.g. according to fields of a request.

Certain embodiments of the present invention are useful in applications in which it is desired to extract pages with keywords and attributes using crawlers, and then automatically generate creatives using predefined rules.

Certain embodiments of the present invention are useful in keyword harvesting applications in which it is desired to extract a search term from website (proxy) logs and to select good search teal's, using a suitable goodness criterion such as conversion, for addition to existing invitation cueing sets.

Certain embodiments of the present invention are useful in keyword harvesting applications in which an invitation display system such as a search engine with invitation display capabilities, more highly rates or positions bidded keywords that are the same as the search term, relative to bidded keywords that are more general than the search term.

Any suitable processor, display and input means may be used to process, display, store and accept information, including computer programs, in accordance with some or all of the teachings of the present invention, such as but not limited to a conventional personal computer processor, workstation or other programmable device or computer or electronic computing device, either general-purpose or specifically constructed, for processing; a display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices.

The following terms may be construed either in accordance with any definition thereof appearing in the prior art literature or in accordance with the specification, or as follows:

Paradigm—A set of invitation Cueing Sets. A campaign which uses a website, such as a website promoting participation in elections, to promote a behavioral goal, such as voting behavior, is an example of a paradigm. The goal may be acquiescence with a behavior proposed by the website such as filling in a voter registration form required for overseas voters.

Expansion tool—A computer based method used to generate a set of keywords given a keyword or a set of positive keywords. There is usually some kind of relation between the input and output, for example, Google's keyword tool.

Feed—Synonym for "website representation".

Invitation—a display of user-sensible content pertaining to a website, the display being associated with the address of the website. An invitation is typically displayed by an invitation displaying system to individual users responsive to invitation cueing keywords found by the system to be associated with the individual users.

Invitation cueing instruction set (also invitation cueing set, ICS)—A set of instructions for an invitation displaying system. The set of instructions typically comprises at least an invitation set, including one or more invitations, and a (positive) keyword set, including invitation cueing keywords. When the (positive) keyword set is provided to an invitation displaying system, the invitation displaying system is operative to display one of the invitations in the invitation set, according to pre-defined invitation selection rules, if there are more than one invitations in the invitation set) to individual users found by the system to be associated with any of the invitation cueing keywords in the (positive) keyword set. An invitation cueing instruction set may include other components, such as a set of negative keywords. An adgroup is an example of an invitation cueing set.

An example of an Invitation Cueing Set is as follows:

```
Positive keywords=(
    • "elections"
    • "voting"
    • "republican candidate"
);
invitations=(
    • Join the elections
      Click here to register
      quick and free
      voteintheunitedstates.com
    • Support the Republican Candidate?
      Click here to
      register and influence
      voteintheunitedstates.com
)
Negative Keywords = (
    • Senate
    • Congress
)
```

Item Description—A textual segment, possibly with formatting, which gives information about an item and its features. For example, "<PAGE>voteintheunitedstates.com/JohnSmith.html; 45, John Smith </Page>".

Keyword—a set of words and symbols. For example, "John", "Apollo 13", "Q&A".

Land URL—The address or location for which an invitation invites. For example, "voteintheunitedstates.com/JohnSmith.html", "phone no. +972-(70)-07070707", Metadata—Any information which refers to some item. For instance, Keyword's metadata can be its source, number of words, type (negative, positive), performance metrics etc.

Negative keyword—a keyword which is defined by an owner of an individual website and which, if associated by an invitation display system with a certain user, would cue the invitation display system such as a search engine, to refrain from displaying an invitation to the individual website to that user. Usually, negative keywords override positive keywords associated with the same user in that a user associated with a positive keyword and a negative keyword defined for the same website, is typically not exposed, by the invitation display system, to an invitation to that website.

Page—webpage.

Page Attribute (or just Attribute)—A feature of a page or of items described within the page. For example, in a page containing a candidate for presidency with his name, age, height and political view, each of the above can be an attribute.

Performance Metric—A quantitative measure which is associated with an element (such as but not limited to a keyword or invitation) in a Paradigm, and which quantifies performance of the element. For example, performance metrics of a keyword may include the number of times it was used to search and/or the number or percentage of users who after using the keyword for searching clicked on the website owner's invitation. Performance metrics of an invitation may for example include the number of times it was viewed and/or the number of clicks it earned and/or the number of users who, after clicking on it, registered.

Positive/Negative Condition—In this invention: a Boolean expression used to select a subset of items from a set of items using their metadata.

Positive Keyword—a keyword which is defined by an owner of an individual website and which, if associated by an invitation display system with a certain user, would (typically, unless overridden by a negative keyword associated with the same user) cue the invitation display system such as a search engine, to display an invitation to the individual website to that user.

Possible actions—a set of textual strings that an action (or equivalent) field may contain. For example, clicks, registration, purchase, voting or other forms of acquiescence with a website proposed alternative.

Rules—a set of instructions in a predefined format which instruct a process how to take specific decisions.

Search phrase—A keyword which is given to a search engine in order to find relevant items. For example, "elections".

Source—An element (positive keyword, page, feed etc.) which by applying some action or a set of actions on or related to it yielded another element, will be called the source of the latter. Given a multiplicity of sources, which is the direct source or simply the source can be understood from the context. Moreover an element may have multiple sources. For example, using the Expand Keyword process on the keyword "voting" the result may be "Ukraine elections" and "US voting", so the source of both will be "voting".

User—A person or computer based entity that uses an information network and is invited to visit various websites.

Website Owner—A person or computer based entity that manages the performance of an individual website including issuing invitations to users to visit the individual website, typically via an invitation displaying system.

Website Representation—An object, physical or virtual, which contains detailed information on a website or certain parts of it. For example, as per the example of FIG. 8 which is a partial representation of a kenshoo.com website. Format is a list of <PAGE> tags, with an attribute named url (which contains the page address), the title of the link to the page on the main page, a comma, and the headline of the page.

Keyword—string of letters and numbers which may or may not be subdivided into words, such as "Vote Johnson".

Website log—(a) a log of traffic arriving at an individual website and interacting therewith, including a record of the requests to the website and responses provided by the website. Some requests include search terms. For example, certain requests includes a referrer field indicating the referring entity (typically the URL of a referring website such as a search engine including the search term, which when used by the requester, resulted in the requester being invited to click on the URL of the individual website inter alia), or (b) A set of records describing transactions (requests and responses) that have passed through the website.

Acquiescence—a user's acceptance of at least one suggestion presented by a website including providing at least one website-requested input other than a website navigating input. For example, if a user fills out a voter registration form presented by and appearing within a website, this is may be defined by a system as an instance or form of acquiescence. Joining a distribution list promoted within a website may be defined by a system as an instance or form of acquiescence. Signing a petition presented within a website may be defined by a system as an instance or form of acquiescence. Making a donation responsive to a cause presented by a website may be defined by a system as an instance or form of acquiescence.

BRIEF DESCRIPTION OF THE DRAWINGS

Certain embodiments of the present invention are illustrated in the following drawings:

FIGS. 7A-7H are data tables which may be used by the system of FIG. 1 in accordance with certain embodiments of the present invention;

FIG. 8 is an example of a website representation which may be used as input by the system of FIG. 1 in accordance with certain embodiments of the present invention;

FIG. 9 is a simplified pictorial illustration of a first website owner validation display screen which may be presented by the optional website owner validation functional unit of the system of FIG. 1;

Figure 10:
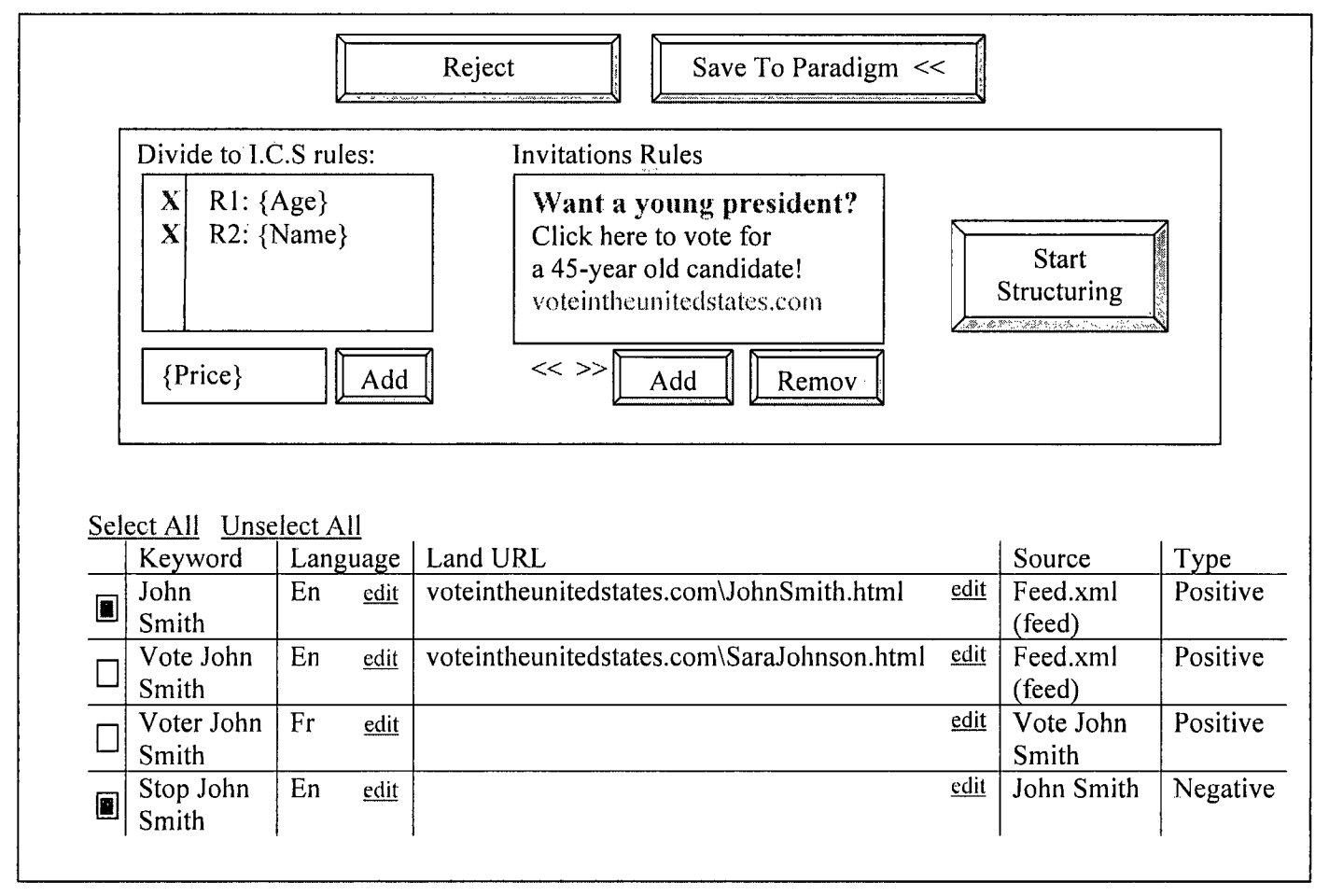

FIG. 10 is a simplified pictorial illustration of a second website owner display screen which may be presented by the optional website owner validation functional unit of the system of FIG. 1;

FIGS. 11A-11F describe various example states of the source table of FIG. 7D, which may occur in example uses of the system of FIG. 1;

FIGS. 12A-12B describe example states of the page table of FIG. 7A, which may occur in example uses of the system of FIG. 1;

FIGS. 13A-13J describe various example states of the positive keyword table of FIG. 7B, which may occur in example uses of the system of FIG. 1;

FIGS. 14A-14B describe example states of the page attribute table of FIG. 7C, which may occur in example uses of the system of FIG. 1;

FIGS. 15A-15B describe various example states of the Invitation cueing set table of FIG. 7F, which may occur in example uses of the system of FIG. 1;

FIGS. 16A-16B describe various example states of the Invitation table of FIG. 7E, which may occur in example uses of the system of FIG. 1;

FIG. 17 describes an example state of the Website Log table of FIG. 7G, which may occur in example uses of the system of FIG. 1;

FIGS. 18A-18B describe various example states of the Negative keywords table of FIG. 7H, which may occur in example uses of the system of FIG. 1.

DETAILED DESCRIPTION OF CERTAIN EMBODIMENTS

Figure 1:
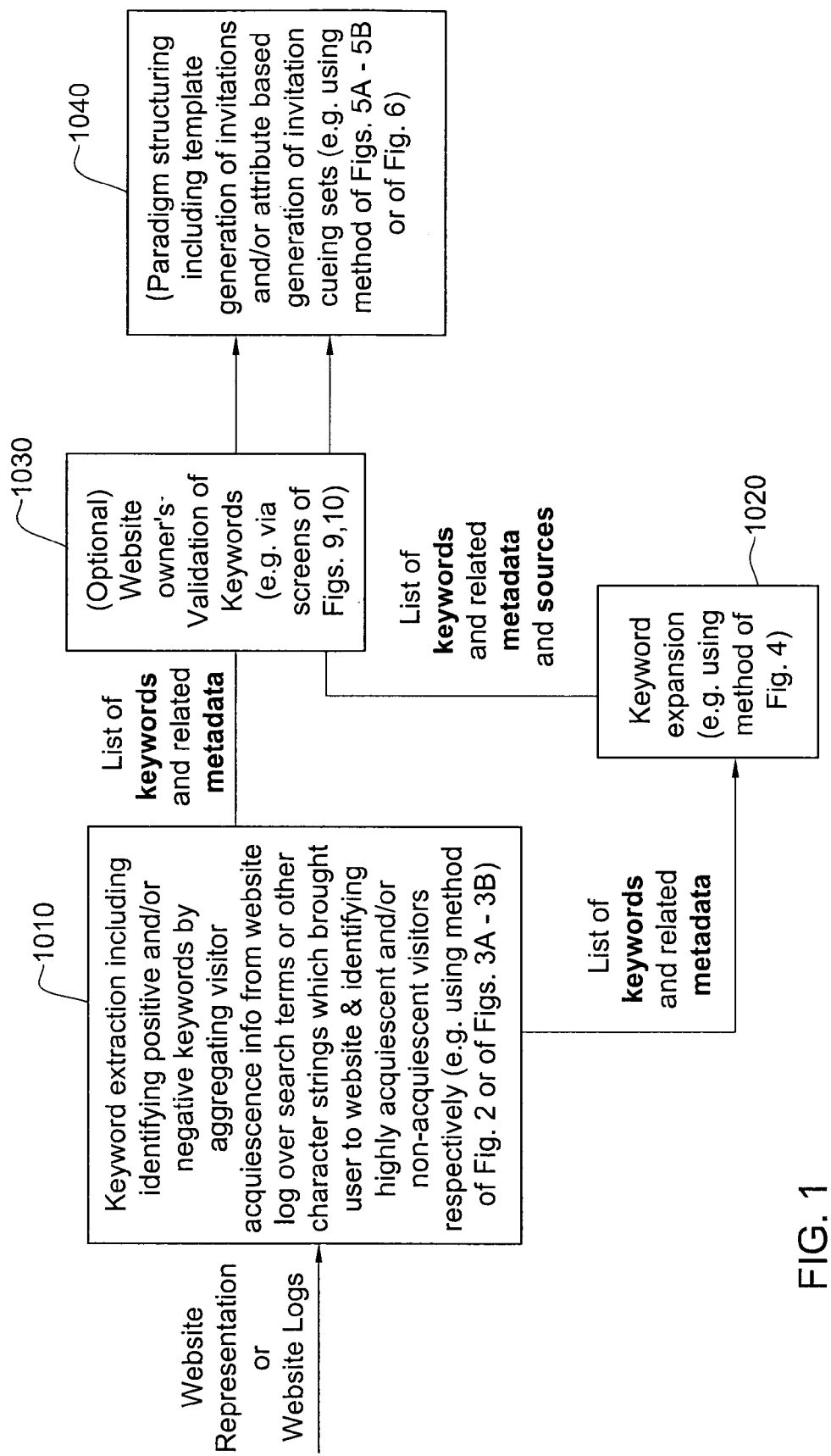
FIG. 1 is a simplified functional block diagram illustration of a system for positive and/or negative Keyword Acquisition and Paradigm generation, the system being constructed and operative in accordance with certain embodiments of the present invention.

FIG. 1 is a simplified functional block diagram illustration of a system for positive and/or negative Keyword Acquisition and Paradigm generation, the system being constructed and operative in accordance with certain embodiments of the present invention. The output of keyword extraction unit 1010 may be stored in the page, positive keyword, page attribute and source tables of FIGS. 7A-7D respectively as described in detail below. The output of keyword expansion unit 1020 may also be stored in the page, positive keyword, page attribute and source tables of FIGS. 7A-7D respectively as described in detail below. The output of the Paradigm structuring unit 1040 may be stored in the positive keyword, invitations and invitation cueing set tables of FIGS. 7B, 7E and 7F respectively, as described in detail below.

Figure 2:
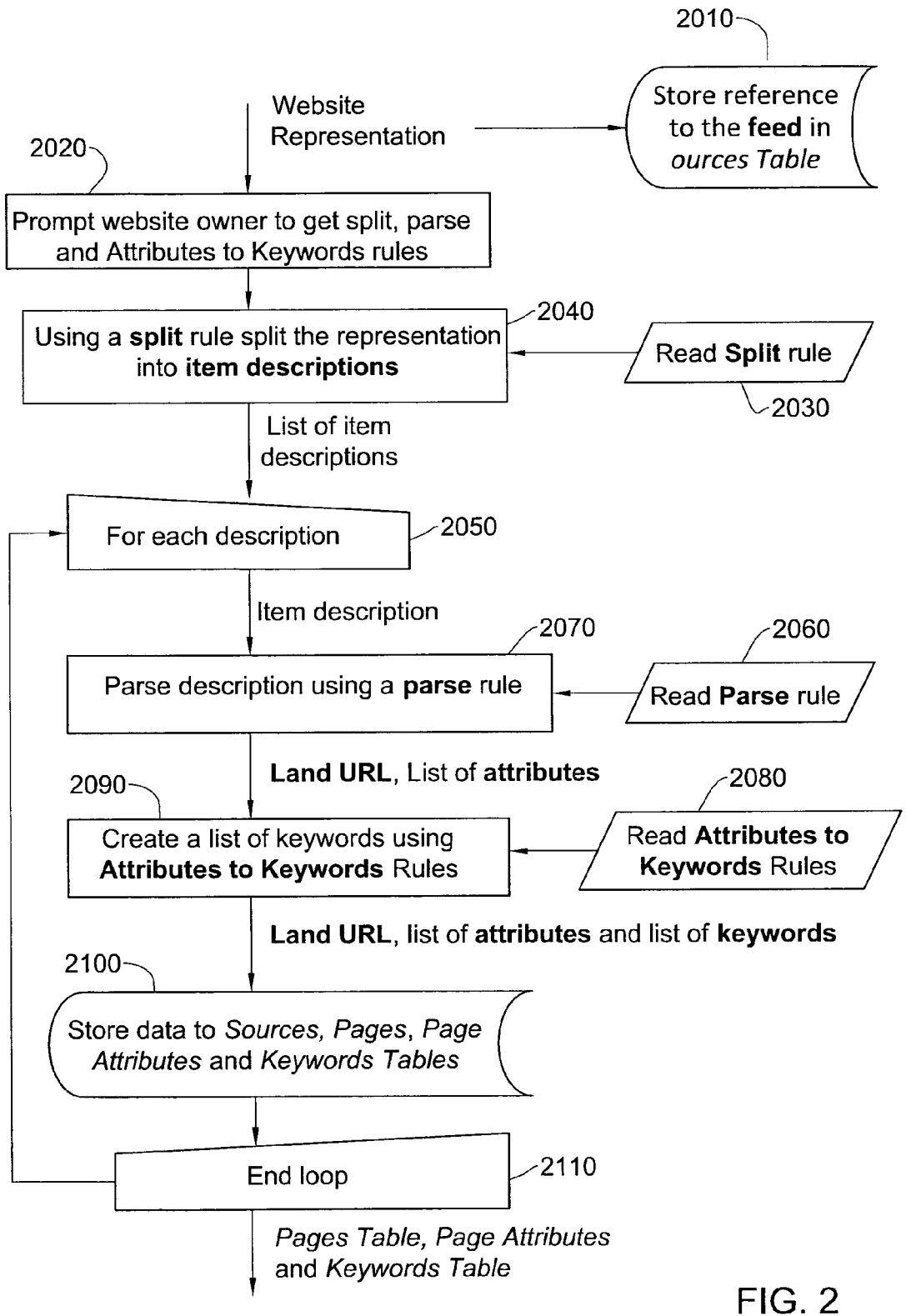
FIG. 2 is a simplified flowchart illustration of a method for Keyword Extraction from a Website Representation, the method being constructed and operative in accordance with certain embodiments of the present invention. The method of FIG. 2 is suitable for implementing the operation of functional unit 1010 of FIG. 1, according to a first embodiment of the present invention in which keywords are extracted from a digital representation of a website which may or may not include the website itself.

FIG. 2 is a simplified flowchart illustration of a method of operation for the Keyword Extraction unit 1010 of FIG. 1, the method being constructed and operative in accordance with certain embodiments of the present invention in which the input to the unit 1010 comprises a Website Representation. The method of FIG. 2 typically comprises some or all of the illustrated generally self-explanatory steps, suitably ordered e.g. as illustrated.

Regarding steps 2020-2070, various formats of website representations may be used and the rules used by the Extract Keywords process may be different than those specifically illustrated. For instance, a keyword extraction system may be designed which can extract keywords from a given known format, such as an RSS, which has a well defined structure having no degrees of freedom. In this case, no rules need be provided by a website owner who provides the RSS to the system.

An item description validation step may be added, e.g. immediately after step 2050. In this step, the system can check that each item description is valid, typically in the sense that when processed in subsequent steps, it will produce sensible results. An example for such validation is to provide a Java Regular Expression as a validation rule. An item description is then valid if the expression is found in the item description, and invalid otherwise. This validation is beneficial when the item descriptions are actual web-pages.

Figure 3A:
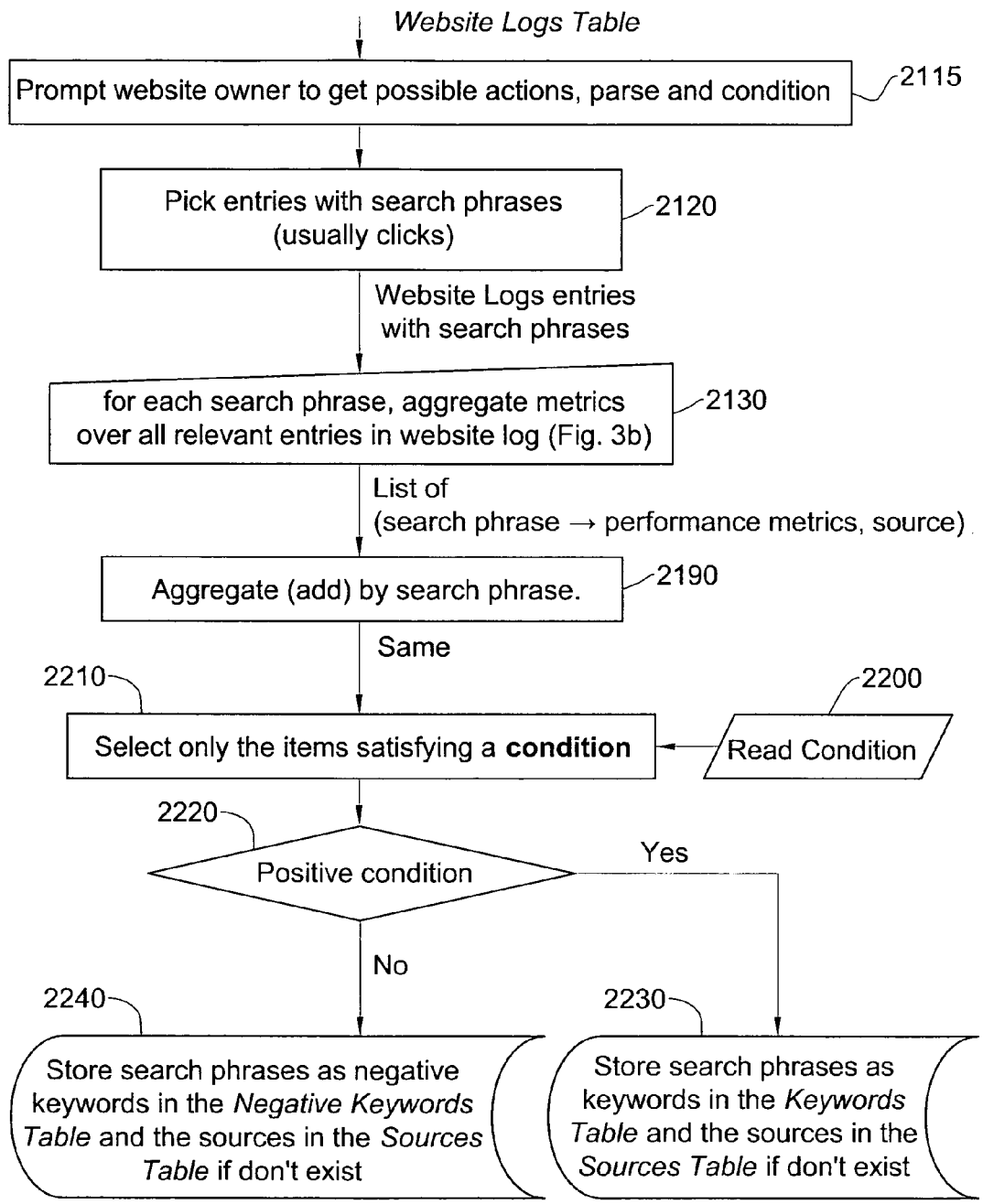
FIG. 3A is a simplified flowchart illustration of a method for Keyword Extraction from Website Logs, the method being constructed and operative in accordance with certain embodiments of the present invention. The method of FIG. 3A is suitable for implementing the operation of functional unit 1010 of FIG. 1, according to a second embodiment of the present invention in which keywords are extracted from a website log.

FIG. 3A is a simplified flowchart illustration of a method of operation for the Keyword Extraction unit 1010 of FIG. 1, the method being constructed and operative in accordance with certain embodiments of the present invention in which the input to the unit 1010 comprises a Website Log. The method of FIG. 3A typically comprises some or all of the illustrated generally self-explanatory steps, suitably ordered e.g. as illustrated. In Step 2140, the source ID may, for instance, appear as a parameter in a redirecting URL which exists in an invitation generated by a SEM system. The user tracking ID may appear as an HTTP cookie. The search phrase may for example be derived from the referrer field of the HTTP request, which is the URL of the page the user came from. This URL often includes a standard parameter whose value is the search term. For instance, the fields may be:

GET voteintheunitedstates.com/JohnSmith.html?keyword_id=1&invitation id=1
Cookie: YTGHIKLJHNBVMNBY
Referrer: fakese.com/search?q=Voting+John+Smith.

Figure 3B:
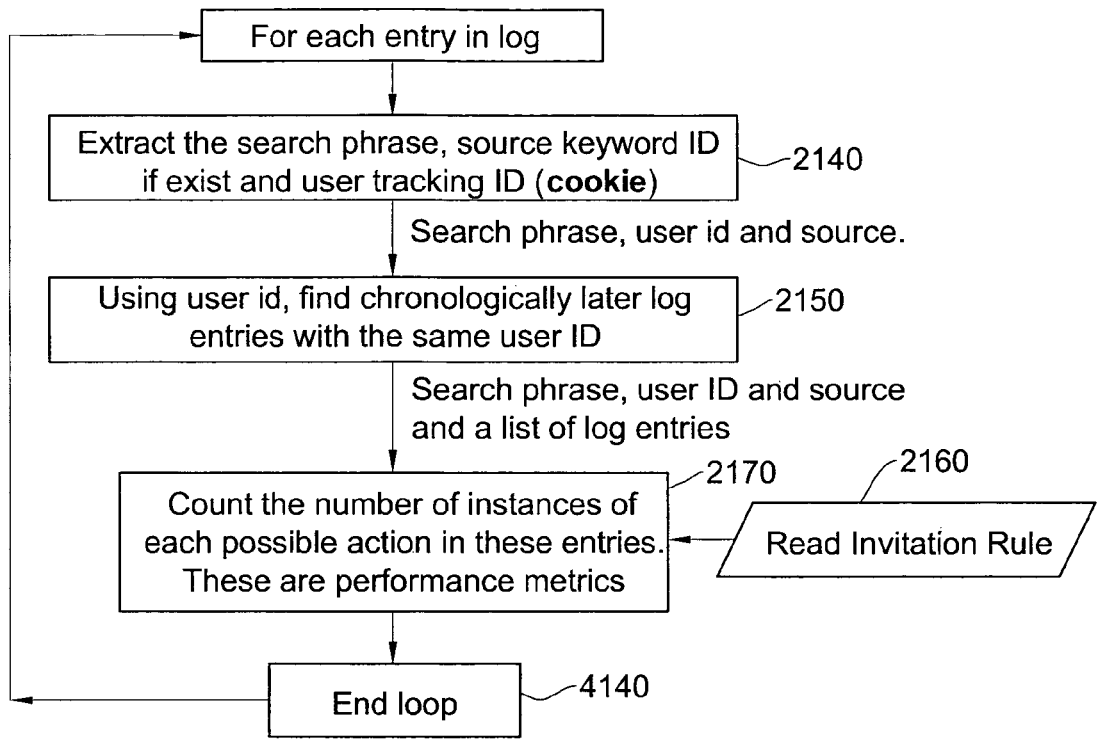
FIG. 3B is a simplified flowchart illustration of a method for performing the per-search phrase metric aggregation loop of FIG. 3A, the method being constructed and operative in accordance with certain embodiments of the present invention.

FIG. 3B is a simplified flowchart illustration of a method for performing the per-search phrase metric aggregation step 2130 of FIG. 3A, the method being constructed and operative in accordance with certain embodiments of the present invention. The method of FIG. 3B typically comprises some or all of the illustrated generally self-explanatory steps, suitably ordered e.g. as illustrated.

Figure 4:
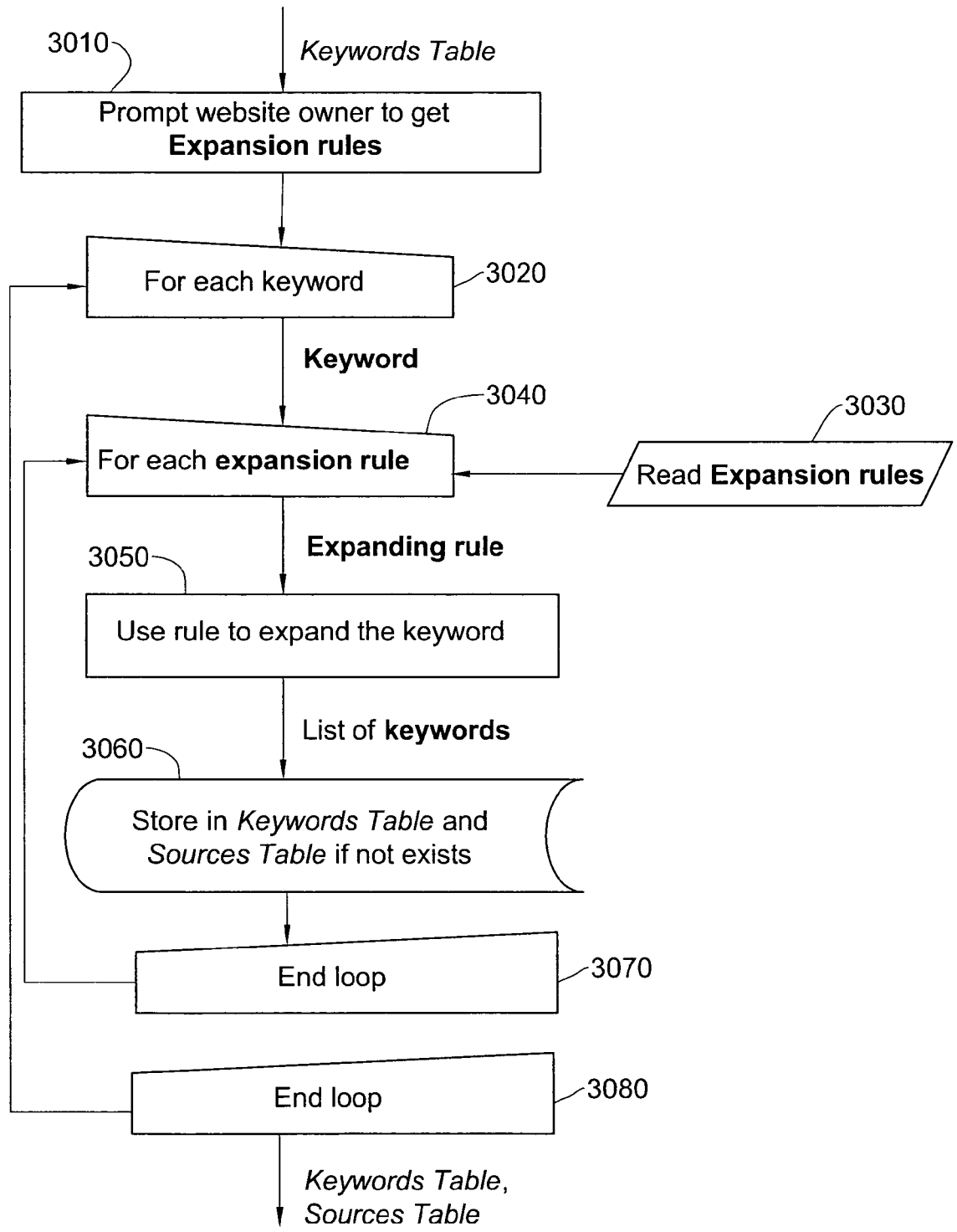
FIG. 4 is a simplified flowchart illustration of a method for Keyword Expansion, the method being constructed and operative in accordance with certain embodiments of the present invention. The method of FIG. 4 is suitable for implementing the operation of functional unit 1020 of FIG. 1.

FIG. 4 is a simplified flowchart illustration of a method of operation for the Keyword Expansion unit 1020 of FIG. 1, the method being constructed and operative in accordance with certain embodiments of the present invention. The method of FIG. 4 typically comprises some or all of the illustrated generally self-explanatory steps, suitably ordered e.g. as illustrated. In Step 3050, each expansion rule typically may either point to a proprietary keyword expansion tool or include a form of redirection to a conventional keyword expansion tool such as but not limited to Google's keyword tool, Wordtracker and Seo Book Keyword Suggestion Tool.

Figure 5B:
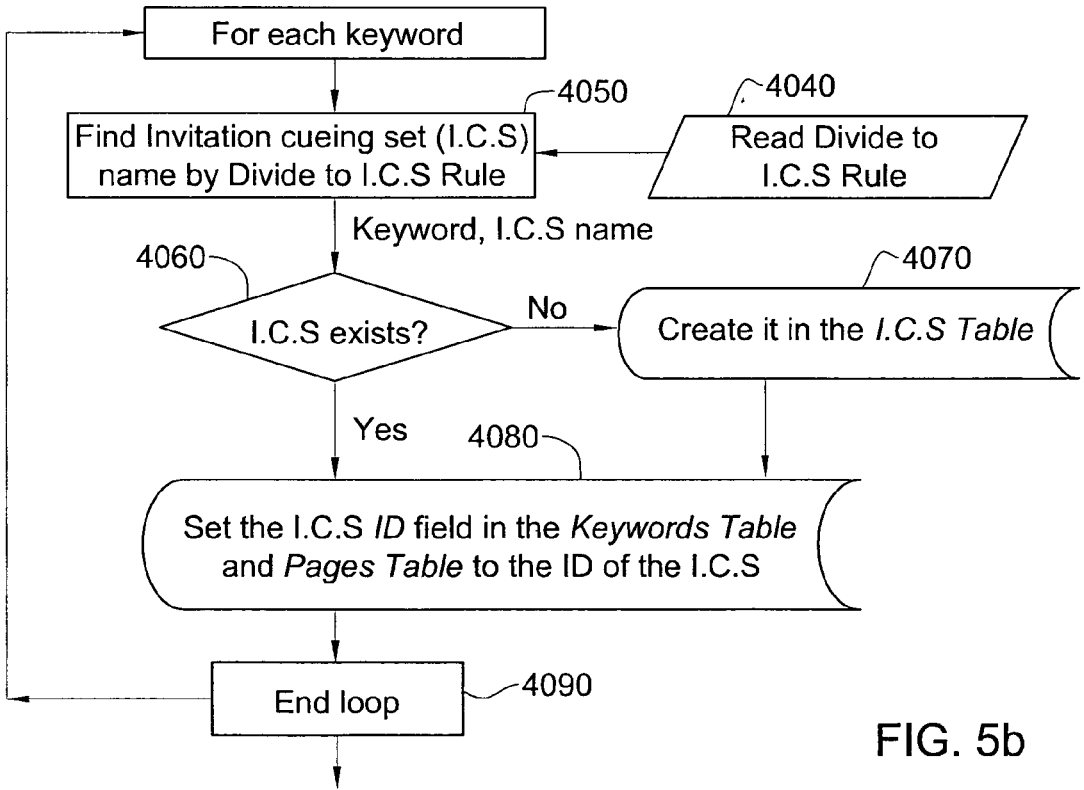
FIG. 5B is a simplified flowchart illustration of a method for performing the "divide keywords into invitation cueing sets" loop of FIG. 5A, the method being constructed and operative in accordance with certain embodiments of the present invention.
Figure 5A:
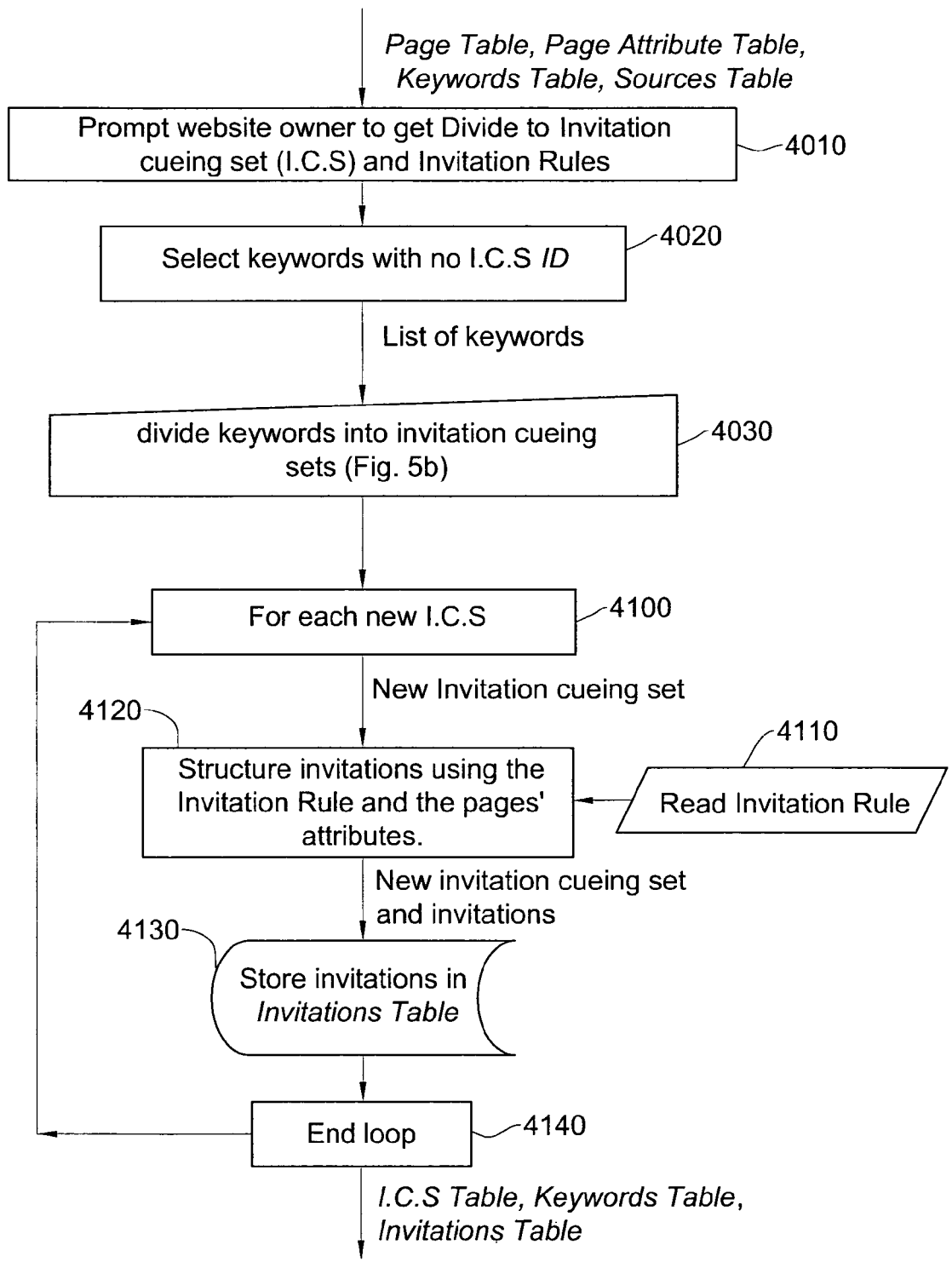
FIG. 5A is a simplified flowchart illustration of a method for Paradigm Structuring—given a list of positive keywords, the method being constructed and operative in accordance with certain embodiments of the present invention. The method of FIG. 5A is suitable for implementing the operation of functional unit 1040 of FIG. 1, according to a first embodiment of the present invention in which a paradigm is structured in accordance with a list of keywords.

FIG. 5A is a simplified flowchart illustration of a method of operation for the Paradigm Structuring unit 1040 of FIG. 1, given a list of positive keywords, the method being constructed and operative in accordance with certain embodiments of the present invention. The method of FIG. 5A typically comprises some or all of the illustrated generally self-explanatory steps, suitably ordered e.g. as illustrated. Regarding Steps 4050 and 4120, the rules typically instruct how to obtain attributes per positive keyword, using fields included in the keyword's record in the Positive Keyword Table of FIG. 7B, such as the Page ID field Source field, Invitation Cueing Set ID, etc. The rules may instruct how to use these IDs as references to other tables such as the Page Attribute Table of FIG. 7C, in order to obtain respective information stored there, such as page attributes.

FIG. 5B is a simplified flowchart illustration of a method for performing the "divide keywords into invitation cueing sets" step 4030 of FIG. 5A, the method being constructed and operative in accordance with certain embodiments of the present invention. The method of FIG. 5B typically comprises some or all of the illustrated generally self-explanatory steps, suitably ordered e.g. as illustrated.

Figure 6:
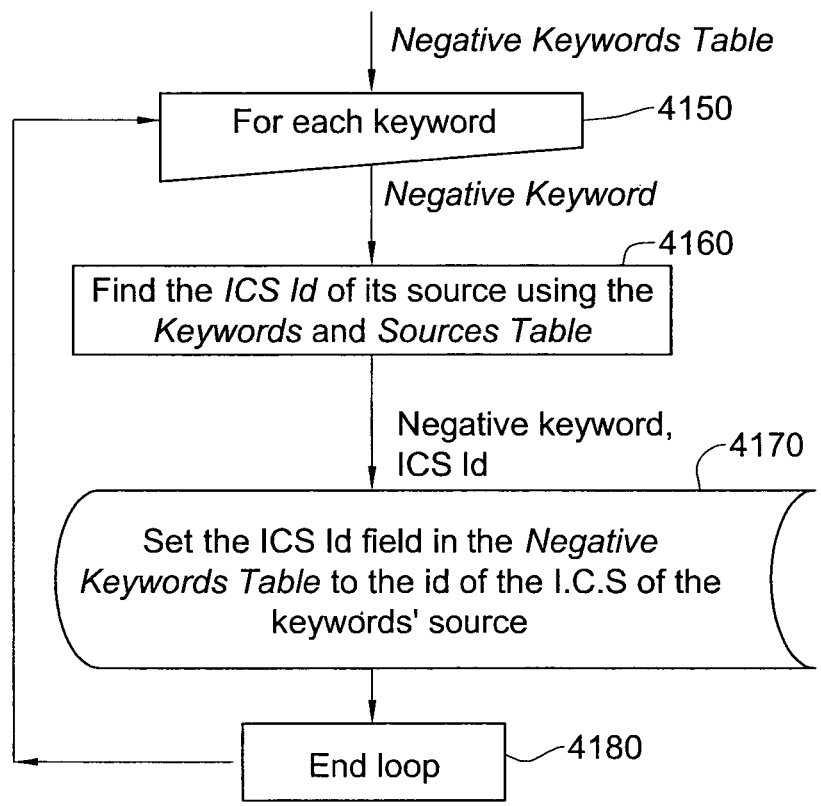
FIG. 6 is a simplified flowchart illustration of a method for Paradigm Structuring given a list of negative keywords, the method being constructed and operative in accordance with certain embodiments of the present invention. The method of FIG. 6 is suitable for implementing the operation of functional unit 1040 of FIG. 1, according to a second embodiment of the present invention in which a Paradigm is structured with a list of negative keywords.

FIG. 6 is a simplified flowchart illustration of a method for Paradigm Structuring—given a list of negative keywords, the method being constructed and operative in accordance with certain embodiments of the present invention. The method of FIG. 6 typically comprises some or all of the illustrated generally self-explanatory steps, suitably ordered e.g. as illustrated.

Additional parameters may be set in the process of paradigm structuring, depending on the specific invitation displaying system. For instance, in several such systems it is possible to set Geo-Targeting to Paradigms and to Invitation Cueing Instruction Sets, thereby to address an invitation only to certain users such as users from a specified region or only those users who use a specified language. The language field in the Positive Keywords can be used to ensure that keywords in French do not become part of Invitation Cueing Instruction Sets which are displayed in English-speaking countries and vice versa.

In Steps 2020, 2115, 3010, 4010 and the like, prompting of the website owner can be replaced by initially storing the relevant information in a suitable data structure, and retrieving therefrom as the relevant information is used.

An example of a suitable Data Structure for the system of FIG. 1 includes the tables of FIGS. 7A-7H. Page Data may be stored in the PagesTable of FIG. 7A. The language field can be extracted automatically by standard packages, given as a parameter in various ways or left for the website owner to manually configure, with some arbitrary default. In specific examples below the default was chosen to be "En" (code for English). Positive keywords may be stored in the Positive Keywords Table of FIG. 7B.

Page Attributes may be stored in the Page Attributes Table of FIG. 7C. If all of the attributes are instances of a small number of abstract attributes, then the name and the type fields can be stored in a separate table, called Abstract Attributes, together with an identifying field, so that in Page Attribute Table the name and type will be replaced with the identifying field from AbstractAttributes.

Sources may be stored in the Sources Table of FIG. 7D. Invitations may be stored in the invitations table of FIG. 7E. Invitation Cueing Sets may be stored in the Invitation Cueing Set Table of FIG. 7F. Website Log data may be stored in the website log Table of FIG. 7G. Many other fields may exist in the website log table other than those shown. Negative Keywords may be stored in the Negative Keywords Table of FIG. 7H.

Suitable rules, such as some or all of the following rules, may be provided by a website owner and suitably stored:

a. Attributes to Keywords rule—Instruct the Extract Keywords process (step 1010 in FIG. 1) how to create keywords according to page attributes. For example, given the attributes Name="John Smith", PoliticalView="democrat" a rule can be R:The {PoliticalView} {Name}

So the resulting keyword will be "The democrat John Smith"

b. Divide to Invitation Cueing Set rule—Instruct the Structure Paradigm process how to divide the keywords to Invitation Cueing Set according to their metadata. For example, the rule can be R:Keyword.Source Each keyword will be inserted to an Invitation Cueing Set whose name is the same as the keyword's source.

c. Expansion rule—Instruct to the expansion process how to find for each keyword/set of keywords a set of related keywords. The simplest form is a list of expansion tools.

d. Invitation rule—Instructs the Structure Paradigm process how to construct an invitation using the positive keywords of the Invitation Cueing Set and related metadata. For example, given the page attribute related to a certain Invitation Cueing Set—MaritalStatus="Single", Age=45—the rule can be R: Header="Want a {MaritalStatus} President?" Line1="Click here to vote for" Line2="a {Age} years old candidate!" LandURL="voteintheunitedstates.com"

So the resulting invitation will be

Want a Single President?

Click here to vote for a 45 year old candidate!

voteintheunitedstates.com e. Parse rule—Instructs the Extract Keyword process how to extract attributes from item descriptions in the website representation. For example, R:<PAGE>{Land URL}; {Age},{Name}</Page>

Using it on the item description

<PAGE>voteintheunitedstates.com/JohnSmith.html; 45, John Smith <Page> yields the attributes Land URL=voteintheunitedstates.com Age=45

Name=John Smith f. Split rule—Instructs the Extract Keyword process how to split the web representation into item descriptions. For example, the rule, written as a Java Regex, can be

R: .*;

Using it on the website representation

John Smith, 45; Israel Israeli, 77;

yields

John Smith, 45

Israel Israeli, 77

Additional Data structures, other than the tables and rules described, may include some or all of the following:

a. Website Representation which may, for example, be stored in a string b. List of item descriptions which may for example be stored in a linked list of strings c. Item description which may for example be stored in a string d. A (Land URL, List of attributes) pair which may for example be stored in two variables (String and String), a list of strings or a specially devised data structure e. A (Land URL, list of attributes, list of keywords) triplet which may for example be stored in three variables (String, String and List of Strings), a list of objects or a specially devised data structure f. Website Logs entries with search phrases (same as the full table only in memory) which may for example can be stored in a table like data-structure (list of records)

g. A (Search phrase, user id, source) triplet which may for example be stored in three variables (String, String and Integer), a list of objects or a specially devised data structure h. A (Search phrase, user id, source, a list of log entries) set which may for example be stored in four variables (String, String, Integer and List of Website Logs records), a list of objects or a specially devised data structure i. List of (search phrase→performance metrics, source) which may for example be stored in a Map of (search phrase→List of object containing List of floating precision numbers and integers)

j. List of Keywords which may for example be stored as a List of strings (each keyword comprising a string).

k. A (Keyword, Invitation Cueing Set Name) pair which may for example be stored in two variables (String and String), a list of strings or a specially devised data structure l. Invitation Cueing Set which may for example be represented by an ICS Id (integer) or as a List of Lists containing a List of positive keywords (strings), List of negative keywords (strings), List of invitations (a specially devised data structure based upon the Invitation Table record) and a Map of properties (Name→Value)

m. A (Invitation Cueing Set, Invitations) pair which may for example be stored in two variables (Invitation Cueing Set and a specially devised data structure based upon the Invitation Table record)

n. Possible Actions which may for example be stored as a list of strings o. Conditions which may for example can be stored as a list of strings Simplified pictorial illustrations of display screens useful for obtaining a website owner's validation of keywords are shown in FIGS. 9 and 10. A Basic view is shown in FIG. 9 and a "Save to Paradigm" view is shown in FIG. 10. Clicking on "Save to Paradigm" in the screen display of FIG. 9 brings up the screen display of FIG. 10. In FIG. 9, "select all" and "unselect all" serve to mark or unmark all records. "Reject" serves to remove select keywords from the table. "Save to Paradigm" serves to open the structuring pane of FIG. 10. The leftmost column comprises selectable box icons. The table of FIG. 9 presents the results of the keyword expansion unit 1020, say, of FIG. 1, for website owner validation. The website owner is typically able to change certain parameters; in the illustrated embodiment the parameters the website owner is entitled to override are marked by "edit".

In FIG. 10, the website owner can typically delete any of the "divide to invitation Cueing sets" rules by using the X option, and can add a new such rule by pressing "add". Arrows may be provided to allow the website owner to navigate up and down the list of invitation rules; such rules can typically be removed, or more can be added. The "start structuring" button allows the website owner to initiate the Paradigm structuring method of FIG. 5 or FIG. 6.

Two examples of work sessions using the system of FIG. 1 are now described. Various states of the tables of FIGS. 7A-7H are presented in FIGS. 11A-18B.

Example 1

A first example workflow is now described with reference to FIGS. 11A-11D, 12A-12, 13A-13E and 14A-16B. Carmel, a website owner, is developing an application designed to increase the awareness to the US elections using the Internet. For this cause, Carmel establishes a website named voteintheunitedstates.com, which contains details on the candidates. Moreover, she wants to initiate a search engine sponsored Paradigm which will attract more US citizens to the website and hence to vote.

Carmel's website contains two pages, one for each of the following two candidates:

1. John Smith, a 45 year old Democrat, and
2. Sara Johnson, a 43 year old Republican In order to create the Paradigm using the embodiment disclosed above, Carmel prepares the following Website Representation:

```
START OF XML FILE MySite.xml
<PAGE url=" voteintheunitedstates.com\JohnSmith.html">
    45, John Smith, male, democrat
</ PAGE>
< PAGE url="voteintheunitedstates.com\ SaraJohnson.html ">
    43, Sara Johnson, female, republican
</ PAGE>
END OF XML FILE
```

Carmel also predefines rules used by the methods of FIGS. 1-6, such as the following rules R1 to R6. Rules can be defined in any suitable format. Below the format of the split rule is Java Regular Expression. The expansion rule is formatted as a list of expansion tool. The other rules below use { } parentheses, with the attribute name in it, as a place-holder for an attribute value, as seen in the examples above.

```
R1 (Split Rule):
    <PAGE.*</PAGE>
R2: Parse Rule
    { } is a placeholder sign;
    <PAGE url={LandUrl}>
        {Age},{Name}, {Gender},{Party}
    </ PAGE>
```

R3: Attributes2Keywords Rules
  1. Vote {Name}
  2. {Party} candidate
R4: Expansion Rules
  1. Use FakeKeywordTool, an online free keyword expanding tool
  2. Use a conventional Translator package; English French
R5: Divide to Invitation Cueing Set by Attribute Rule
Page. {Name} OR Source.ICS ID
R6: Invitation Rule
Vote For {Name}
Participate in the US Elections!
Vote for the {Party} candidate!
Voteintheunitedstates.com She provides all of this data to the system of FIG. 1. Keyword Extraction may be performed as per the method of FIG. 2; Step 2040 (splitting MySite.xml to item description using the Split Rule), yields:

1. <PAGE url="voteintheunitedstates.com\JohnSmith.html">45, John Smith, male, democrat</PAGE>
2. <PAGE url="voteintheunitedstates.com\ Sara-Johnson.html">43, Sara Johnson, female, republican<PAGE>

The per-description Loop 2050 is now performed for Item description #1. Step 2070 (Parsing item description using the Parse Rule), yields the following Attributes:

LandURL="voteintheunitedstates.com\JohnSmith.html"
Age=45
Name="John Smith"
Gender="male"
Party="democrat"

Step 2090 (Create a list of positive keywords using Attributes2Keywords Rules), yields:
Vote John Smith
Democrat candidate Step 2100: The state of the Sources Table of FIG. 7D is as shown in FIG. 11A. The state of the Pages Table of FIG. 7A is as shown in FIG. 12A. The state of the Positive Keywords Table of FIG. 7B is as shown in FIG. 13A. The state of the Page Attributes Table of FIG. 7C is as shown in FIG. 14A.

The Loop defined by step 2050 in FIG. 2 is now performed for Item description #2, including steps 2070, 2090, 2100 in FIG. 2. The state of the Sources Table of FIG. 7D is as shown in FIG. 11B. The state of the Pages Table of FIG. 7A is as shown in FIG. 12B. The state of the Positive Keywords Table of FIG. 7B is as shown in FIG. 13B. The state of the Page Attributes Table of FIG. 7C is as shown in FIG. 14B.

Keyword Expansion is now performed as per the method of FIG. 4. In the Loop defined by step 2130 in FIG. 3A, the positive keyword=Vote John Smith. Expansion Rules R4 as defined by Carmel are used to obtain expansion tools. Per-expansion rule Loop defined by step 3040 in FIG. 4 yields: Expanding Tool=FakeKeywordTool. In Step 3050, this tool is used to find related keywords, e.g.: John Smith→(Governor Smith, voting Smith). After Step 3060 (Store), the state of the Sources Table of FIG. 7D is as shown in FIG. 11C and the state of the Positive Keywords Table of FIG. 7B is as shown in FIG. 13C. In the Per-expansion rule Loop defined by step 3040 in FIG. 4, Expanding Tool=Translator—English to French. Following Steps 3050 and 3060, the state of the Positive Keywords Table of FIG. 7B is as shown in FIG. 13D.

Following the loops defined by steps 3020 and 3040 of FIG. 4 for the rest of the keywords, the state of the Sources Table of FIG. 7D is as shown in FIG. 11D. The state of the Positive Keywords Table of FIG. 7B is as shown in FIG. 13C

Website owner validation may optionally be sought. Display screens e.g. those of FIGS. 9-10 may be displayed to Carmel to enable her to validate certain keywords and delete others. For instance, the keyword "Johnson Security LTD" is obviously not relevant for the Paradigm, so Carmel might want to delete it. Alternatively, as is assumed in the illustrated example, the system can continue automatically without seeking website owner validation.

Structuring of a Paradigm based on the above output is performed in accordance with the method of FIG. 5A. Step 4020 (Select keywords with no Invitation Cueing Set ID), yields the following Keywords Ids: (1, 2, 3, 4, 5, 6, 7, 8, 9, 10, 11). In the Per-keyword Loop defined by step 4030 in FIG. 5A, keyword #1: Vote John Smith. In Step 4050 (Using Divide to Invitation Cueing Set by Attribute Rule R5 as defined by Carmel), the Invitation Cueing Set Name is "John Smith". Step 4060 (Invitation Cueing Set Exists?) goes to No. This yields the state of Invitation Cueing Sets Table of FIG. 7F shown in FIG. 15A. After Step 4080 (Set the Invitation Cueing Set ID), the state of the Positive Keywords Table of FIG. 7B is as shown in FIG. 13E. Performing the Per-keyword Loop defined by step 4030 in FIG. 5A including steps 4050-4080, for the rest of the positive keywords, yields the state of the Invitation Cueing Set Table as shown in FIG. 15B and the state of the Positive Keywords Table of FIG. 7B as shown in FIG. 13F. In the Loop defined by step 4100 in FIG. 5A, Invitation Cueing Set #1: John Smith. In step 4120: an invitation is created using the Invitation Rule R6 defined by Carmel. This yields, for example, the following invitation:
Vote For John Smith
Participate in the US Elections!
Vote for the democrat candidate!
Voteintheunitedstates.com In Step 4130, the invitation is stored e.g. in a table of invitations. The state of the Invitations Table of FIG. 7E is as shown in FIG. 16A. The data shown stored in the data field of FIG. 16A can be stored in separate fields, depending on the systems in which these invitations are presented. In the Loop defined by step 4100 in FIG. 5A: Invitation Cueing Set #2: Sara Johnson. Performing Steps 4120-4130 for this Invitation Cueing Set yields the state of the Invitations Table of FIG. 7E shown in FIG. 16B.

Example 2

Another example workflow is now described, with reference to the tables of FIGS. 11E-11F, 13G-13I, 17 and 18A-18B inter alia. It is appreciated that here as in other examples, these figures do not fully represent the states of various tables indicated, but rather only the states of new or relevant portions of these tables. It is assumed that the initial state of the system of FIG. 1 under Example 2 is the same as the final state of the system under Example 1. In Example 2, after running her Paradigm with the above Invitation Cueing Sets for some time, Carmel decides to use the system of FIG. 1 again, this time using her website's logs instead of MySite.xml as previously. To do so, Carmel defines three possible actions and two conditions: a positive condition PC1 and a negative condition NC1.
Possible Actions: Click, Register, Vote
Positive Conditions: PC1: Register>0
Negative Conditions: NC1: clicks>2 AND Register=0 AND Vote=0

The logs may have the form illustrated in the table of FIG. 17. "fakese.com" can be a known search engine with a known url of search: /?q={search phrase}, so the parsing is straightforward (+ sign stands for a space character). Initially, PC1-Register>0. Keyword extraction is performed as per the method of FIGS. 3A-3B. In Step 2120 (Pick entries with search phrases), Ids=(1, 3, 4, 5, 6). In the Loop defined by step 2130 in FIG. 3A, Entry #1: ID=1. In Step 2140:
Search phrase="Voting John"
Source keyword ID=1
Cookie=8FGJ In Step 2150, later entries with the same user ID are found: Ids=(2). Step 2180 which uses the list of possible actions to compute performance metrics, yields:
Click=1
Register=1
Vote=0
In the Loop defined by step 2130 in FIG. 3A, Entry #2 is ID=3. Following steps 2140-2170:
Click=2
Register=0
Vote=0
Continuing the Loop defined by step 2130 in FIG. 3A for the rest of the keywords yields the following list:

---

(
(Voting John→ Click=1, Register=1, Vote=0, Source=1)
(Stop Vote John Smith → Click=2, Register=0, Vote=0, Source=1)
(Stop Vote John Smith → Click=1, Register=0, Vote=0, Source=1)
(Republican Party → Click=1, Register=0, Vote=1, Source=1)
)

---

Step 2190 (Aggregate) yields:

---

(
(Voting John→ Click=1, Register=1, Vote=0, Source=1)
(Stop Vote John Smith → Click=3, Register=0, Vote=0, Source=1)
(Republican Party → Click=1, Register=0, Vote=1, Source=1)
)

---

Step 2210 uses condition PC1 to choose search phrases and yields:
(Voting John)
After Step 2220 (Positive condition), the state of the Sources Table of FIG. 7D is as shown in FIG. 11E. The state of the Positive Keywords Table of FIG. 7B is as shown in FIG.

13G. Keyword Expansion is now performed as per the method of FIG. 4. After running the two loops of FIG. 4 (as defined by steps 3020 and 3040), as before, the state of the Sources Table of FIG. 7D is as shown in FIG. 11F and the state of the Positive Keywords Table of FIG. 7B is as shown in FIG. 13H. Optional Website owner's validation, e.g. using the screen displays of FIGS. 9-10, is followed by Paradigm structuring e.g. as per the method of FIGS. 5A-5B. Steps 4010 and 4020 (Select positive keywords with no Invitation Cueing Set ID) yield: Keyword ID=12. In the Loop defined by step 4030 in FIG. 5A, Keyword ID=12.

Step 4050 (Using Divide to Invitation Cueing Set by Attribute Rule R5 as defined by Carmel) yields: Source. Invitation Cueing Set ID. The Invitation Cueing Set Name is "John Smith". Step 4060 (Invitation Cueing Set (ICS) Exists?) goes to No. After Step 4080, the state of the Positive Keywords Table of FIG. 7B is as shown in FIG. 13I. The Loop defined by step 4100 in FIG. 5A is performed. There is no new Invitation Cueing Set so the loop ends.

The NC1 condition defined by Carmel is now processed. Steps 2120-2190 of FIG. 3A are performed, yielding:

(
(Voting John→ Click=1, Register=1, Vote=0, Source=1)
(Stop Vote John Smith → Click=3, Register=0, Vote=0, Source=1)
(Republican Party → Click=1, Register=0, Vote=1, Source=1)
)

Step 2210 (Select by condition NC1) yields:
(Stop Vote John Smith)

After Step 2220 is performed (Negative condition), the state of the Negative Keywords Table is as shown in FIG. 18A. Structuring is then performed in accordance with the method of FIG. 6. The Loop defined by step 4150 in FIG. 6 yields Keyword ID=1. In Step 4160: The Invitation Cueing Set ID of source of the keywords=1. After Step 4170, the state of the Negative Keywords Table of FIG. 7H is as shown in FIG. 18B.

The input to the system shown and described herein may comprise a set of pages with URLs differentiated by numerical values of any range. The set of pages may include at least one valid page and at least one invalid page, and at least some of the valid and invalid pages may be identified by the same range of numeric values. A keyword set generator, using any of the methods shown and described above, may include a numerical value range processor operative to identify all sequences of numeric values containing at least one valid page, and to identify and skip invalid pages.

Digital input to the system shown and described herein may comprise a website with more than one URLs, each such URL having a numeric ID field uniquely identifying a corresponding page. A numerical value range processor may define a range of numeric ID fields which includes all of the numeric ID fields in the website, to check all pages in the range for validity.

Figure 19:
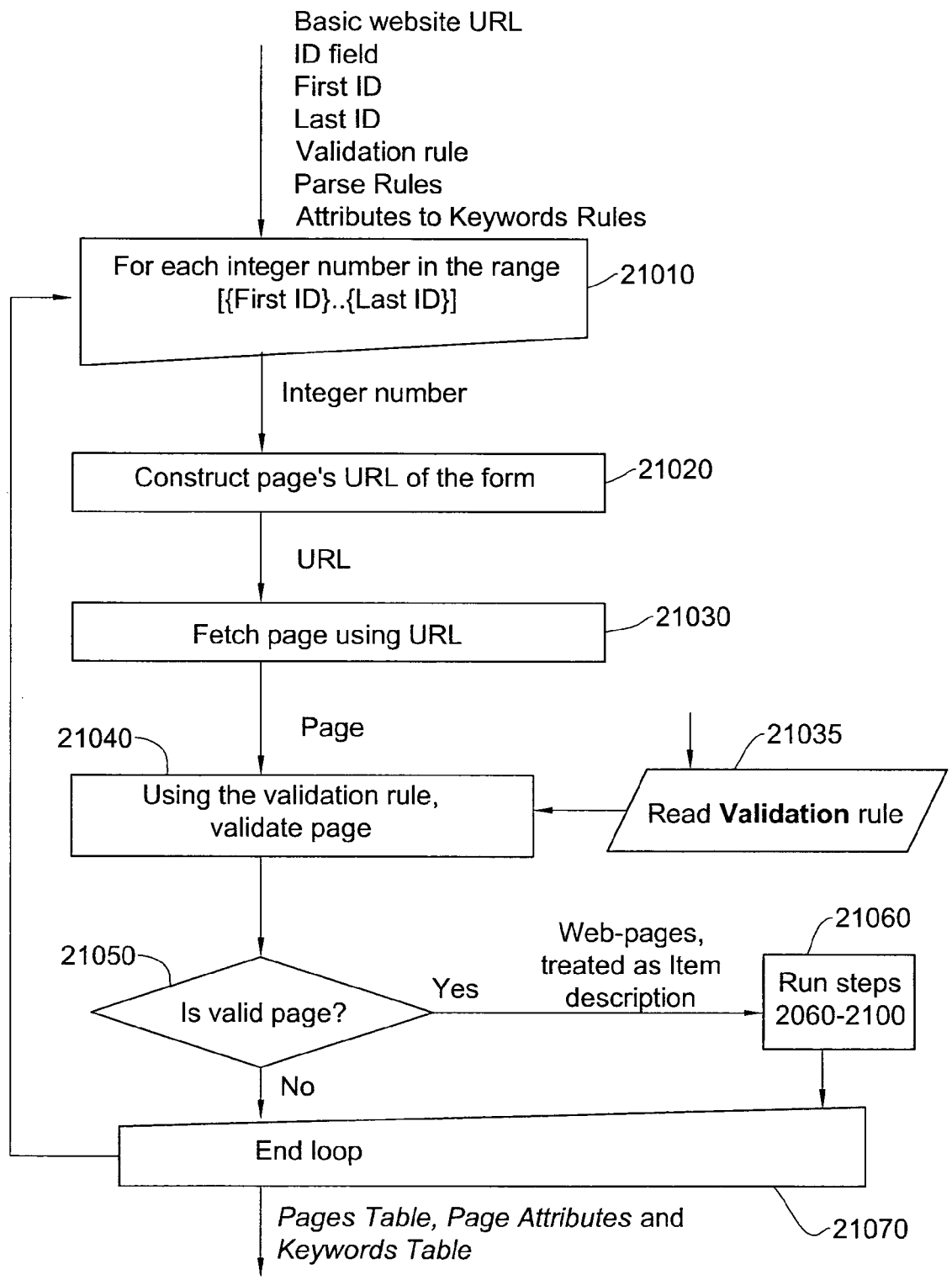
FIG. 19 is a simplified flowchart illustration of a method for numerical crawling which is constructed and operative in accordance with certain embodiments of the present invention.

FIG. 19 is a simplified flowchart illustration of a method for numerical crawling which is constructed and operative in accordance with certain embodiments of the present invention. The input to the method of FIG. 19 may include a Basic URL (a URL on top of which the ID parameter is to be placed), an ID field (the name of the ID parameter), a First ID (the first ID to try), a Last ID (the last ID to try), and a Validation Rule which is used to check that a particular webpage is a valid page, and can serve as an item description. The validation rule may be provided in any suitable format, such as Java Regular Expression.

The method of FIG. 19 typically includes some or all of the following steps, suitably ordered e.g. as illustrated:

Step 21010: For each number in the range [{First ID}. {Last ID}]

Step 21020: Construct a URL of the form URL={Basic URL}?{ID field}={number}.

Or, if other parameters already exist, URL={Basic URL}&{ID field}={number}.

Step 21030: Fetch the page with the above URL.

Step 21040: Validate the page using the validation rule. For instance if the rule is a Java Regular Expression, search for the expression. A valid page is one in which the expression was found.

Step 21050: Is page valid?

Step 21060: If yes, continue with steps 2060-2100 using the page as an item description.

Step 21070: End loop.

The steps of FIG. 19 may replace steps 2010-2050 and 2110 and are particularly advantageous in those applications in which less than all of the integer values in the provided range are valid. The split rule is replaced, in the embodiment of FIG. 19, by the URL construction which in fact can also be regarded as a rule, as it instructs the Extract Keywords process how to construct the URL. The rule can be more general and allow the integer number to appear not only as a parameter but also in other parts of the URL. Alternatively or in addition, the validation steps of FIG. 19 may be added to the method of FIG. 2. The validation rule may vary. One possible rule is to provide a fixed string to search in the page. Another possible rule is to provide a Java Regular Expression, as in the illustrated embodiment. These two possibilities are not intended to be limiting.

Example 3

An Example work session which utilizes the method of FIG. 19 is now described. Carmel has created a new website for encouraging US citizens to vote in the US elections. It contains one page, voteintheunitedstates.com/index.jsp, which is dynamic and has a parameter named "candidate_id". Given the value of this parameter the resulting form of the page is:

candidate_id=1: (voteintheunitedstates.com/index.jsp?candidate_id=1)

The above may be a page describing a first candidate, John Smith, and containing his picture, some details about him (as in the examples above) and a button named "press here to register for the elections".

candidate_id=2: (voteintheunitedstates.com/index.jsp?candidate_id=2)

The above may be a page describing a second candidate, Sara Johnson, containing her picture, some details about her (as in the examples above) and a button named "press here to register for the elections".

For any other value (for instance candidate_id=13) the page may show the following message:

"Sorry, you have reached a missing candidate's page".

Carmel provides the following inputs to steps 21010-21060 of the method of FIG. 19:

Base URL="voteintheunitedstates.com/index.jsp?"; ID field="candidate_id"

First ID=1; Last ID=3; Validation rule="press here to register for the elections".

Carmel then starts running the system, yielding the following results:

Step 2010: (For each number in the range [{First ID} . . . {Last ID}]) number=1

Step 2020: (Construct a URL)
URL="voteintheunitedstates.com/index.jsp?candidate_id=1"
    Step 21030: Fetch the page with that URL
    Page=page of John Smith
    Step 21040: (Validate page)
Look for "press here to register for the elections"—Found
    Step 21050: (Is page valid?)—Yes
    Step 21060: (If yes, continue with steps 2060-2100)
Parse the page of John Smith (similar to Example 1)
    Step 2010: (For each number in the range [{First ID}..{Last ID}]) number=2
    Step 2020: (Construct a URL)
URL="voteintheunitedstates.com/index.jsp?candidate_id=2"
    Step 21030: Fetch the page with that URL
    Page=page of Sara Johnson
    Step 21040: (Validate page)
Look for "press here to register for the elections"—Found
    Step 21050: (Is page valid?)—Yes
    Step 21060: (If yes, continue with steps 2060-2100)
Parse the page of Sara Johnson (similar to Example 1)
    Step 2010: (For each number in the range [{First ID} . . . {Last ID}]) number=3
    Step 2020: (Construct a URL)
URL="voteintheunitedstates.com/index.jsp?candidate_id=3"
    Step 21030: Fetch the page with that URL
    Page=page containing message "Sorry, you have reached a missing candidate's page"
    Step 21040: (Validate page)
Look for "press here to register for the elections"—Didn't Find
    Step 21050: (Is page valid?)—No A particular advantage of certain embodiments of the system shown and described herein is that the total site crawling capability provided is very general and enables almost all relevant websites having a wide variety of site structures, to be crawled. The system shown and described herein is particularly useful in applications in which a website representation is used to construct an initial paradigm. A paradigm updating process is scheduled periodically, such as daily or weekly, in the course of which the website logs of the website accumulated in the relevant period are analyzed by the system, such that beneficial search terms appearing therein can be added constantly as positive keywords whereas keywords which have harmed the performance of the paradigm can be marked as negative keywords.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or, in a different order. "e.g." is used herein in the sense of a specific example which is not intended to be limiting.

The invention claimed is:

1. A system for identifying negative keywords, the system comprising:
    a non-acquiescence information collector configured to
        identify, for each individual website from among a multiplicity of websites, at least one keyword associated with an interaction between at least one user and the individual website, and
        determine that the interaction did not result in acquiescence of the user to at least one suggestion presented by said website;
    a negative keyword definer operative to classify the keyword, responsive to the non-acquiescence information collector determining that the interaction between the user and said website did not result in acquiescence of said user to the suggestion presented by said website, as a negative keyword associated with said website; and
    a paradigm structuring unit configured to cue an invitation display system to refrain from displaying invitations to said website when the negative keyword is used in a search phrase provided to a search engine,
    wherein said non-acquiescence information collector, said negative keyword definer, and said paradigm structuring unit are implemented in any of
        a) computer hardware, and
        b) computer software embodied in a non-transitory, computer-readable medium;
    wherein the non-acquiescence information collector is configured to determine that the interaction did not result in acquiescence of the user by determining that a conversion did not occur as a result of the interaction, wherein the conversion is selected from the group consisting of: a user registration, a user vote, and a user purchase.

2. A method for identifying negative keywords, the method comprising:
- identifying, for each individual website from among a multiplicity of websites, at least one keyword associated with an interaction between at least one user and the individual website;
- determining that the interaction did not result in acquiescence of the user to at least one suggestion presented by said website;
- classifying the keyword, responsive to determining that the instance of the user contact with said website did not result in acquiescence of said user to the suggestion presented by said website, as a negative keyword associated with said website and;
- cueing an invitation display system to refrain from displaying invitations to said website when the negative keyword is used in a search phrase provided to a search engine,
- wherein said identifying, determining, classifying, and cueing are implemented in any of
    a) computer hardware, and
    b) computer software embodied in a non-transitory, computer-readable medium;
- wherein the determining step comprises determining that a conversion did not occur as a result of the interaction, wherein the conversion is selected from the group consisting of: a user registration, a user vote, and a user purchase.

* * * * *